United States Patent [19]

Colberg et al.

[11] 4,270,427
[45] Jun. 2, 1981

[54] BEVEL ANGLE SETTING MEANS FOR A POWER TOOL APPARATUS

[75] Inventors: Richard A. Colberg, Lititz; William T. Henry, Jr., Lancaster, both of Pa.

[73] Assignee: Black & Decker Inc., Newark, Del.

[21] Appl. No.: 118,571

[22] Filed: Feb. 4, 1980

[51] Int. Cl.³ .............................................. B27B 5/24
[52] U.S. Cl. .................................. 83/473; 83/477.1; 83/477.2
[58] Field of Search ...................... 83/473, 477.1, 477.2

[56] References Cited

U.S. PATENT DOCUMENTS

| | | | |
|---|---|---|---|
| 2,850,054 | 9/1958 | Eschenburg | 83/473 |
| 2,852,047 | 9/1958 | Odlum et al. | 83/473 |
| 2,873,773 | 2/1959 | Gaskell | 83/473 |
| 3,670,788 | 6/1972 | Pollak et al. | 83/508.2 |
| 3,910,143 | 10/1975 | Wallace et al. | 83/473 X |
| 4,178,655 | 12/1979 | Little | 16/52 |
| 4,185,415 | 1/1980 | La Conte | 49/248 |

Primary Examiner—Frank T. Yost
Attorney, Agent, or Firm—Harold Weinstein; Leonard Bloom; Edward D. Murphy

[57] ABSTRACT

There is disclosed an improved bevel angle setting means for supporting and pivoting the motor-driven tool supporting assembly of a power tool apparatus including a housing equipped with a table top having an opening through which the motor-driven tool, such as a circular saw, extends; the improvement comprising means for supporting and pivoting the assembly about a pivot axis in a rapid manner whereby the bevel angle is varied. The pivoting means include a bevel handle secured to the assembly frame and a counterbalance means such as a "gas spring," which will be more fully explained hereinafter. The gas spring will act to assist the operator in adjusting the bevel angle setting for both increasing or decreasing of such bevel angle settings.

8 Claims, 9 Drawing Figures

BEVEL ANGLE SETTING MEANS FOR A POWER TOOL APPARATUS

BACKGROUND OF THE INVENTION

In power tool apparatus generally of the nature requiring bevel angle changes, there is the need to locate the operating tool, such as a saw blade, at various angles relative to the horizontal. Typically, this is accomplished by a worm-screw arrangement. For large incremental angle changes, a considerable amount of time is required to set the tool.

In a co-pending application assigned to the present assignee, there is disclosed a power tool apparatus which employs a rapid set lever operated arrangement for positioning the operating tool at desired bevel angles. The serial number for this application is U.S. Ser. No. 31,271 filed Apr. 18, 1979. In circumstances where the weight of the assembly to be pivoted is relatively small, or where the components are mounted physically close to the pivot point, the operator of such equipment generally can move or pivot it through the required bevel angle unassisted by any mechanical leverage scheme. However, for equipment whose purpose is to perform heavy duty work, the pivoted assembly including the motor, operating tool and supporting frame may run as much as forty (40) pounds. Further, because of the component sizes, they must be displaced a relatively large distance from the pivot point. It is therefore impractical and undesirable to move the assembly to the various bevel angles without some form of mechanical advantage or assistance. Heretofore, as noted above, this was accomplished by a worm-screw arrangement which provided the operator with a significant mechanical advantage, but, as noted, resulted in a slow setting of the bevel angle.

It is therefore a primary object of this invention to provide means for assisting the operator in rapidly setting the bevel angle for heavy duty power apparatus such as a table saw.

It is a further object of this invention to provide means for holding the bevel angle position achieved without the need of the operator exerting a holding force.

It is still another object of this invention to provide a means which assists the operator in "holding" the pivoted assembly when returning the tool to a smaller angle setting.

It is yet another object of the invention to provide an operator assist means for setting and resetting the bevel angle which still results in the operator retaining a "feel" as he positions the assembly.

SUMMARY OF THE INVENTION

Towards the accomplishment of these and other objects which will become apparent from a consideration of the drawings and accompanying description, there is disclosed an improved means for pivoting the assembly comprising the motor-driven tool and supporting frame in a power tool apparatus, such that the bevel angle is varied, the means for pivoting including a bevel handle fixedly connected to the frame and a gas spring operatively connected between the housing and the frame.

In a preferred embodiment, the bevel handle and gas spring are connected to substantially the same point on the frame.

For a particular design of the power tool apparatus, it is advantageous to connect the gas spring to the frame such that the orientation of the center line of the gas spring allows the latter to exert a sufficient force on the pivoted assembly at zero bevel angle to resist the natural tendency of the assembly to rotate about the pivot axis.

DESCRIPTION OF THE INVENTION

Figure 1:
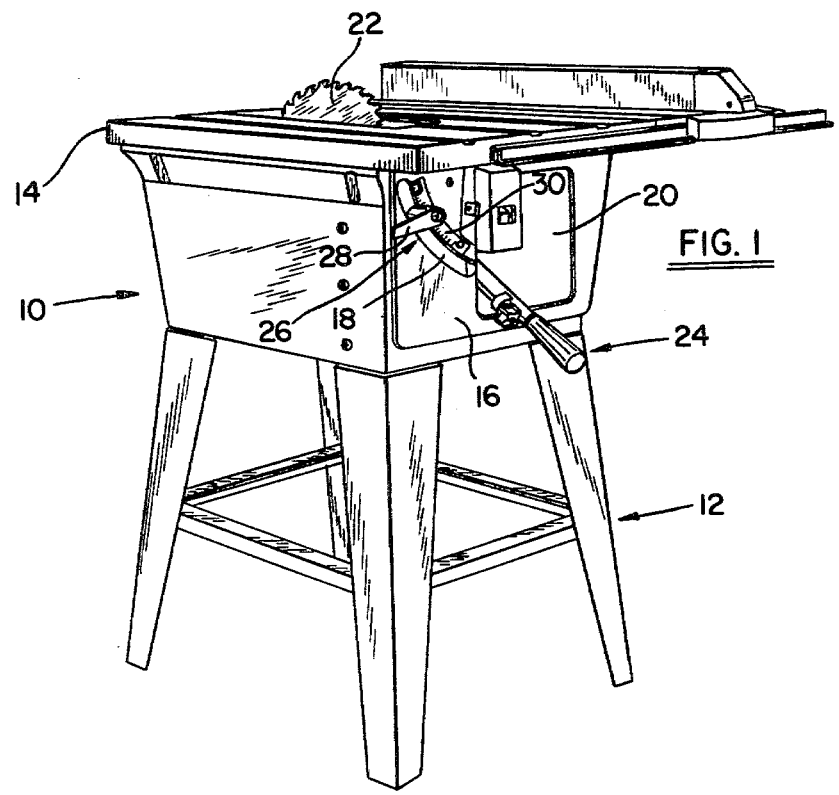
FIG. 1 is a perspective view of a power tool apparatus employing the present invention.

Referring now to FIG. 1, there is shown a power tool apparatus which employs the present invention. It includes a housing 10 which is supported on stand 12. The apparatus includes a table top section 14 and a front face panel 16 having an arcuate slot 18 and opening 20.

Positioned in a suitable opening in the table top 14 is a rotating tool 22, such as a saw.

Protruding from opening 20 is a control lever 24 which operates to raise or lower the rotating tool in the table top opening.

Positioned in arcuate slot 18 is a bevel angle lever 26 which includes a rotating locking grip 28. Also disposed on the front panel 16 is a bevel angle scale 30 which cooperates with a pointer (not shown) to indicate the tilt angle of the blade 22.

Figure 2:
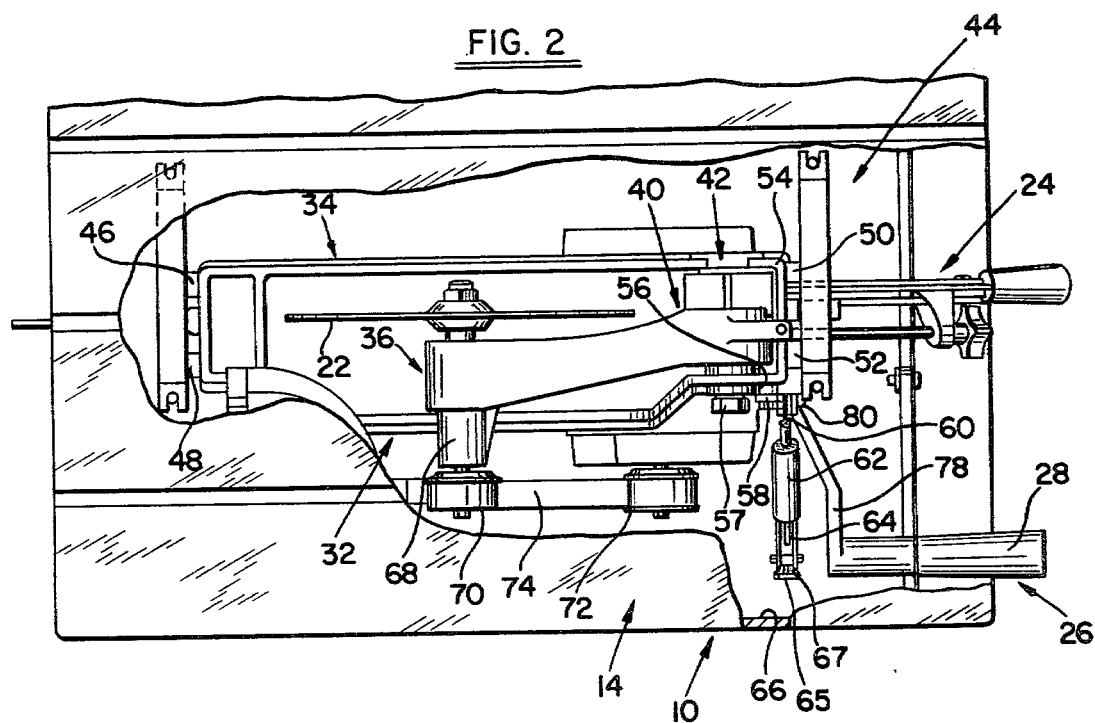
FIG. 2 is a partial plan view of the apparatus of FIG. 1 with a portion of the table top thereof cut away to expose the assembly within.

FIG. 2 is a plan view of the table top 14 which has been cut away to reveal portions of the assembly contained within the housing 10. The detailed explanation of the assembly is described in the aforementioned pending patent application, but for purposes of the present invention the following simplified description is adequate. The basic pivoted assembly 32 includes a frame or carriage member 34 which has a first sub-assembly 36 pivotally mounted therein. The assembly 36 includes the saw blade 22 which is driven by an electric motor 38 suitably secured to a hub 40 which forms a part of the pivoted first sub-assembly 36.

A second sub-assembly 42 includes the control lever 24 which pivots the first assembly in a manner described in the aforementioned pending application.

The entire assembly structure 32 is secured to the underside of the table top 14 by mounting means 44. The latter includes quide pins 46, 48, 50 and 52 which are positioned in an arcuate track 82 as more readily seen in FIGS. 2 and 3.

The frame 32 includes an end section 54 having tapped holes 56 for accepting bolts 57 to hold mounting bracket 58. Pivotally secured to the mounting bracket 58 is the end 60 of a pneumatic device 62, referred to as a "gas spring." This device is distributed in the United States under that name by the Gas Spring Corporation of Montgomeryville, Pa. It is this device, in combination with the power tool apparatus, which forms the improvement of this invention.

The opposite end 64 of the pneumatic device 62 is pivotally secured to a bracket 65 affixed to the side wall 66 of of the housing 10 as by bolts 67. Accordingly, both ends 60 and 64 of the pneumatic device 62 and the cooperating mounting bracket form a pivotal type mounting.

Saw 22 is mounted in hub 68. The rotational mount employs a standard arbor shaft arrangement well known in this field. The shaft includes at one end thereof a pulley member 70 which is connected to the motor output shaft pulley 72 via drive belt 74.

The bevel angle lever 26 includes an arm 78 which is connected on the one end to frame 34 by suitable bracket 80 which may be formed at, or integrally with, bracket 58 so that the effective point of attachment to the frame 34 is the same as that of the end 60 of pneumatic device 62. The other end of the arm 78 is connected to the rotatable locking grip 28 which cooperates with the front face panel 16 to secure the arm and thus the frame at any desired bevel angle.

Assembly 32, as noted above, is suspended from the underside of table top 14 by mounting means 44. From FIG. 3 the latter is seen to include an arcuate track member 82 which is secured to the underside of the table top by screws 83 disposed in mounting tabs 84 and 86. The arcuate track member 82 includes an arcuate slot 87 in which are disposed the guide pins; for example, 50 and 52. Of course, there is an identical mounting scheme at the opposite axial end of the assembly (See FIG. 2).

Radius 88 of the arcuate track 82 is centered in the plane of the top surface 90 of the table top 14 on the line formed by the intersection of the plane of the top surface with the plane containing side 92 of the power tool saw 22. This intersection is designated generally as intersection location point 94.

Figure 4:
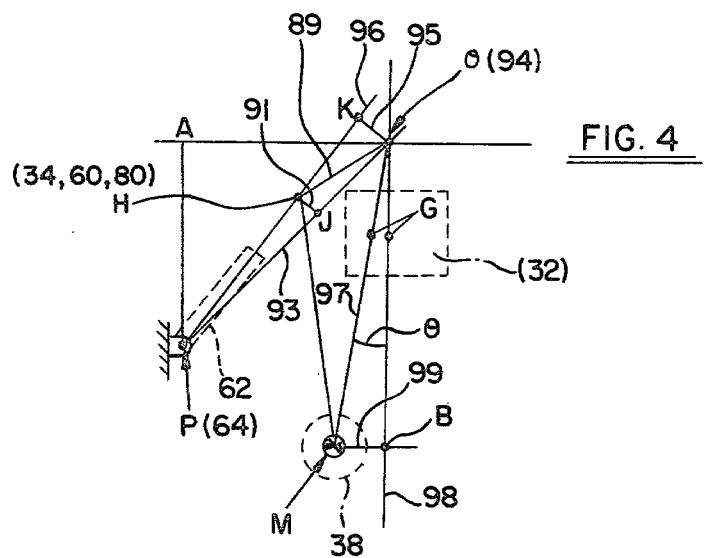
FIG. 4 is a schematic representation showing the angular relationship of the present invention.

FIG. 4 is a schematic representation of the mounting assembly of the pneumatic device 62 and showing the location of the end 64 of the pneumatic device 62 relative to the point 94. Letters are used for the points of origin representative of the assemblies or components of assemblies as follows:

| Letters | |
|---|---|
| P | The end 64 of pneumatic device 62. |
| O | Origin of radius 88. |
| G | Center of gravity (approximate location) of the pivoted assembly 32 other than motor 38. |
| M | Center of gravity of motor 38. |
| H | Point of connection of pneumatic device end 60, arm end 80 and frame 34. A line 89 is drawn through points H and O. |
| J | Point of intersection of line 91 drawn from point H and at a right angle to, and intersecting with, line 93 drawn through points O and P. |
| K | Point of intersection of line 95 drawn from point O and at a right angle to line 96 drawn through points P and H. |
| θ | Angle between vertical center line 98 which is drawn downwardly through point O, and line 97 connecting points O, G and M. |
| B | Point of perpendicular intersection of line 98 by a line 99 drawn from point M. |

The approach to selecting the type of pneumatic device needed to be employed and its location along the side wall 66 of the housing is based on the summation of moments equation considering the various weights, frictional force and their relative position to the point O which serves as the pivot origin 94. The summation equation for the situation where the centers of gravity G and M, respectively, are disposed to the left of the vertical center line 98 as shown in FIG. 4 is as follows:

$$\Sigma M = 0 = M_H + M_M + M_G - M_S - M_f$$

Where,
$M_H$ is the moment associated with the bevel handle 28 force applied by the operator,
$M_M$ is the motor 38 moment,
$M_G$ is the pivot assembly 32 moment other than that caused by the motor 38,
$M_S$ is the moment attributed to the pneumatic device 62 force, and
$M_f$ is the moment attributed to all frictional forces.

The above assumes the counterclockwise direction to be positive.

The equation can be developed, and a determination made of the actual bevel handle 28 force required by the operator, for a given pneumatic device and location, or this information can be gotten empirically.

Figure 5:
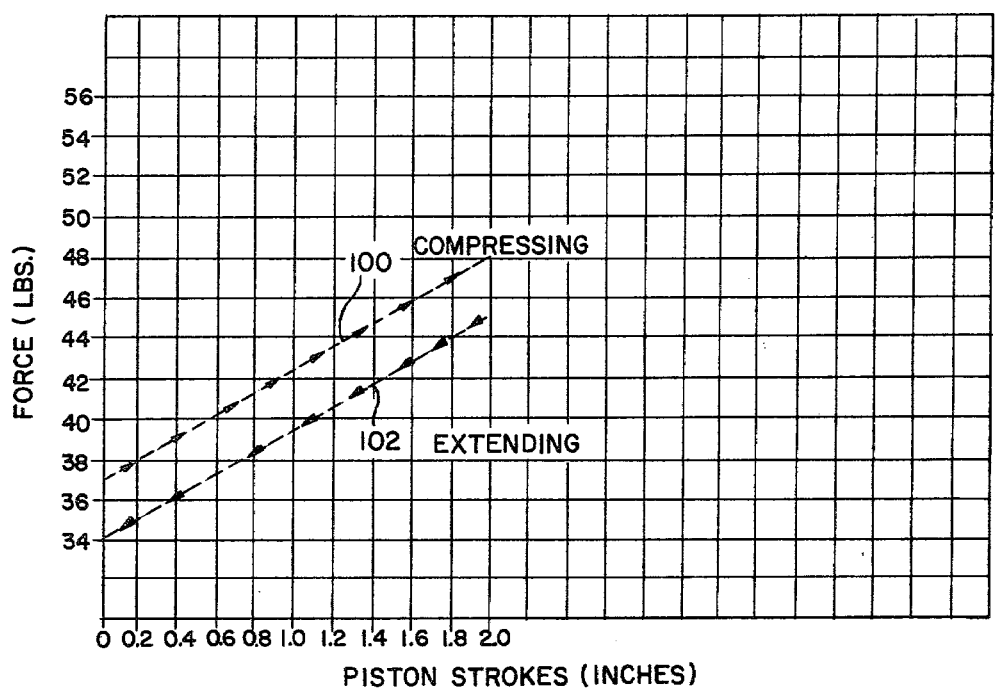
FIGS. 5 and 6 are graphs of force diagrams related to the present invention.

FIG. 5 represents a force diagram for conventional pneumatic device 62, which diagram may aid in solving for the moment $M_S$. The force diagram plots the compressive forces along line 100 and the extension forces along line 102. Expressed mathematically, $F_S = F_O + K(X)$ Where,
K is the slope of the force characteristic curve for a given pneumatic device,
X is the difference between the maximum extended length of the piston less the distance measured along line 96 from point P to point H (See FIG. 4) for 0° bevel angle,
$F_O$ is the initial force at 0° bevel angle, and
$F_S$ is the spring force.

Two such equations are developed, one for compression and one for extension.

Figure 6:
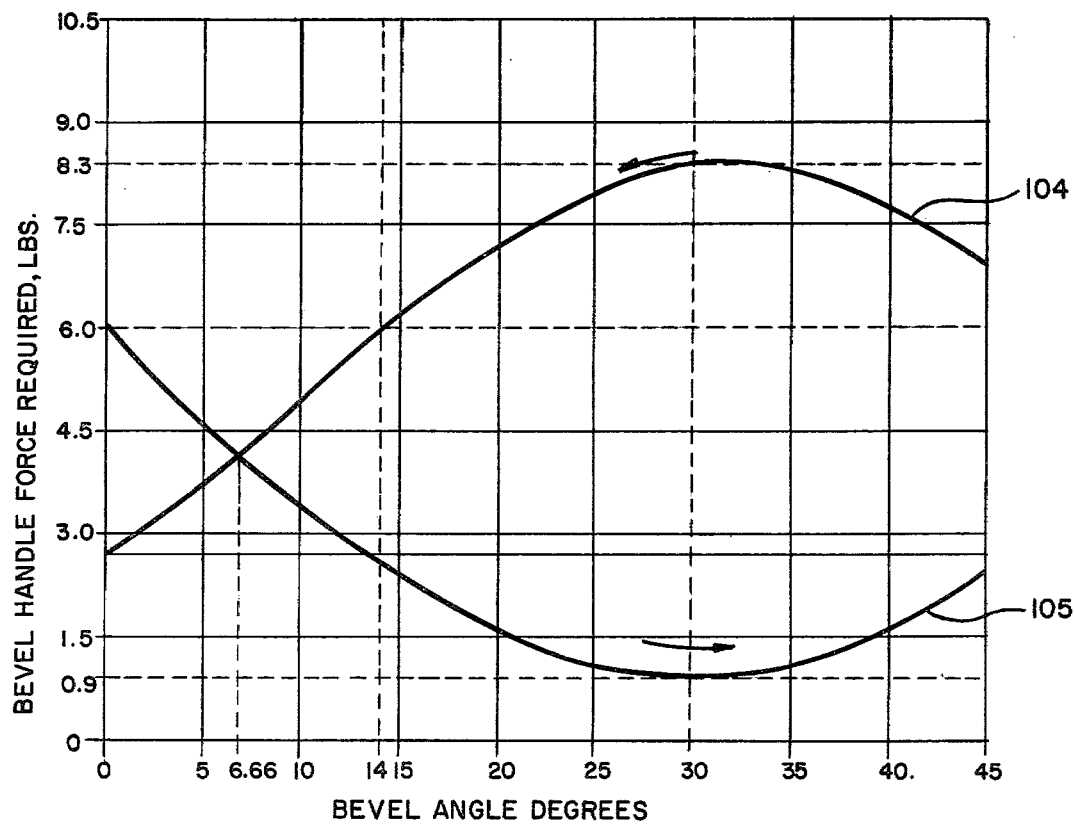

If the particular moment arms, component weights and frictional forces are inserted in the above moment equation, $M_H$ is solved for a given bevel handle length. A typical composite bevel handle force versus bevel angle curve would be as shown in FIG. 6. The two curves depict the necessary operator force required at each bevel angle setting to change from one position to another, with the second setting resulting in an angle which is either larger or smaller. The two line curves 104 and 105 of FIG. 6 result because there are two line curves 100 and 102 for the gas spring 62 forces (See FIG. 5). If, for example, the assembly 32 were at a bevel angle setting of 30° and the operator desired to change to 45°, and referring to line curve 105, he would be required to apply an initial force at the start of just 0.90 pounds. However, if he wished to go from 30° to 0°, and referring to line curve 104, he would require an initial force of approximately 8.3 pounds. When the weights of the various components are considered, this nominal force is a significant improvement.

Consider, for example, the power tool apparatus wherein the invention was first employed. The weights of the motor 38 and pivotal assembly 32 (without the motor 38) are 15.5 pounds and 11.5 pounds, respectively, and the moment arms at 0° bevel are approximately 8.6 inches and 3.7 inches, respectively. The frictional moment for steel guide pins 46, 48, 50, 52 and arcuate track 82 and the radius 88 of approximately 3.9 inches is on the order of 31.5 inch-pounds. The bevel handle 28 moment arm H-O (89) is approximately 7.6 inches. It is apparent that without some form of assistance it would be impractical to make rapid bevel angle settings or resettings, especially at large bevel angles. However, through the use of the present construction of the present invention, including the gas spring 62 having an extending force of 29 pounds and a stroke length of 2 inches, the dramatically improved results of FIG. 6 are achieved and rapid bevel angle settings are made possible.

As implied, this bevel handle 28 force determination depends primarily on the weight of the components, their physical location relative to the pivot axis 94 (O) and the type and characteristics of the gas spring 62 selected.

Figure 3:
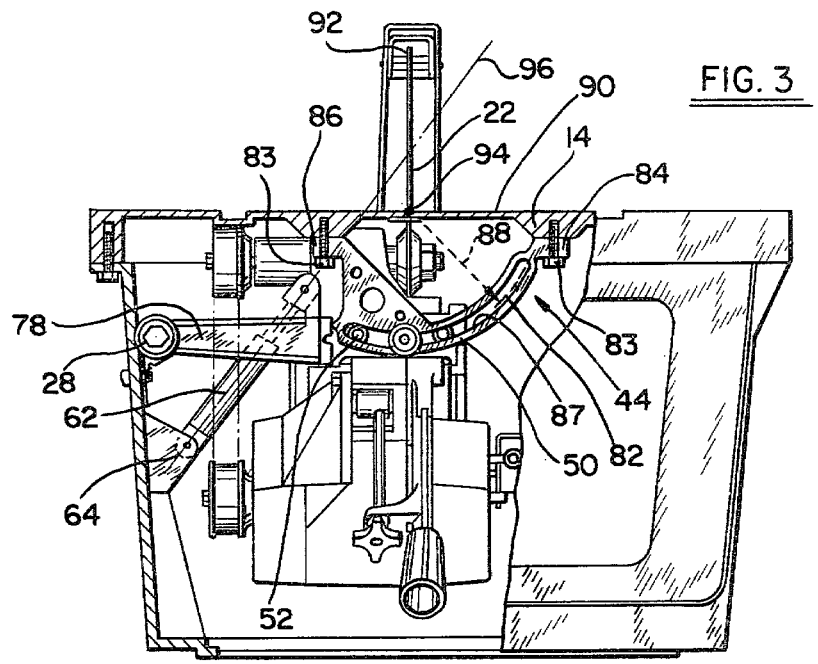
FIG. 3 is an elevational view of the apparatus of FIG. 1.

The gas spring 62 employed can be located as in FIG. 3, so as to provide a lifting force at 0° bevel angle. For example, from FIG. 6 it is seen that the breakaway bevel handle 28 force for the line curve 105 is 6 pounds. This means that because of the gas spring 62 there is a net force of 6 pounds at the point of its connection to the frame 34 which is tending to pivot the assembly 32 clockwise, and the operator must offset this before he can change the bevel angle setting to a larger one. This positive force at 0° bevel angle also prevents a drifting away from that position by the assembly. One way this positive force can be increased, if needed, is by orientating the gas spring 62 between the housing 10 and the assembly 32 such that its piston at 0° will be compressed more. For a fixed design and for a given gas spring 62 this can be accomplished by raising the pivotal location of end 64 of the spring 62 at its sidewall 66 connection.

Figure 7A:
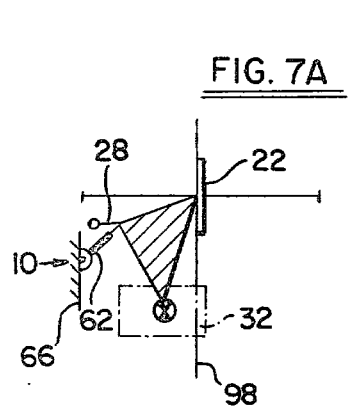
FIG. 7 is a schematic representation showing the various bevel angle positions of the present invention.
Figure 7B:
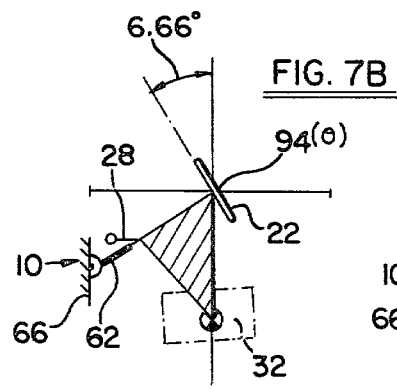
Figure 7C:
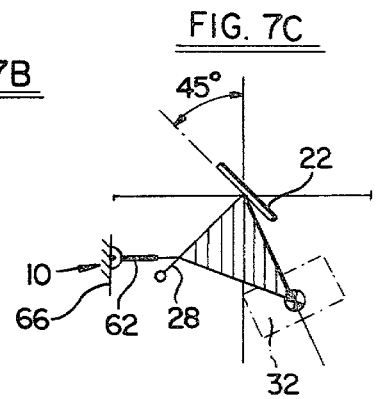

From the line curves 104 and 105 of FIG. 6 (particularly 104), and the schematic representation in FIG. 7C, it can be appreciated how, because of the gas spring 62, the assembly 32 is restrained at larger bevel angles in its natural tendency to reorientate itself to a smaller bevel angle.

The line curve 104 of FIG. 6 shows that at larger bevel angles, when it is desired to reduce the bevel angle, the force tending to resist the change for angles above approximately 14°, is 6 or more pounds. This, in effect, is a retarding force which assists the operator as he seeks to reduce the bevel angle setting.

FIGS. 7A, 7B and 7C schematically show the relative location of the gas spring 62, saw 22, housing 10, pivotal assembly 32, including the motor 38, and bevel handle 28 for three bevel angle settings of FIG. 7A—0°, FIG. 7B—small bevel angle (6.66°) and FIG. 7C—45°. For the particular design involved, the gas spring 62 exerts a force which produces a clockwise moment for bevel angles from 0° to approximately 6.66° as shown in FIG. 7B.

Beyond 6.66°, the force exerted by the spring produces a counterclockwise moment which offsets the clockwise moments of the pivotal assembly 32 including the motor 38.

In the preferred embodiment the gas spring 62 produces zero torque about the pivotal axis 94 (O) when it lies colinear to the line 93 (See FIGS. 4 and 7B) such that an extension of the upper end 60 passes through such axis 94.

It is apparent that the selection of the gas spring 62 and its mounting location relative to the housing 10 and assembly 32 is a question of design and within reasonable limits is subject to substantial variation. The design of the present invention enables the operator to rapidly pivot the assembly 32 through bevel angle settings of from 0° to 45°, wherein such assembly 32 may weigh 40 pounds or more. Such bevel angle settings are made possible with minimum effort while still permitting the operator to retain a "feel" for his equipment through the novel assembly combination of the present invention.

It will be understood that various changes in the details, materials, arrangement of parts and operating conditions which have been herein described and illustrated in order to explain the nature of the invention may be made by those skilled in the art within the principles and scope of the invention.

Having thus set forth the nature of the invention what is claimed herein is:

1. In a power tool apparatus including a housing equipped with a table top having an opening through which a motor-driven saw can pass, an assembly pivotally mounted in the housing about a first pivot axis, the assembly including the motor and saw, and supporting frame, the improvement which comprises means for pivoting the assembly about the first pivot axis in a rapid manner, whereby the bevel angle of the tool is quickly set, said means for pivoting including a handle fixedly connected to the frame, and a gas spring of predetermined characteristics operatively connected between the housing and the frame.

2. In a power tool apparatus including a housing equipped with a table top having an opening through which a motor-driven saw can pass, an assembly pivotally mounted in the housing about a first pivot axis, the assembly including the motor and saw, and supporting frame, and a handle connected to the frame for pivoting same, the improvement which comprises means for pivoting the assembly about the first pivot axis in a rapid manner, whereby the bevel angle of the tool is quickly set, said means for pivoting including a gas spring operatively connected between the housing and the frame.

3. The improvement claimed in either claim 1 or claim 2 wherein at substantially zero torque of the assembly about the pivot axis the center line of the gas spring is colinear with a line drawn between the connection of said gas spring to the housing and the pivot axis of the assembly.

4. The improvement claimed in claim 3 wherein said gas spring is colinear at one of a predetermined bevel angle settings of the assembly about the pivot axis with said angle within the range of between 0° and 10°.

5. The improvement claimed in either claim 1 or claim 2 wherein said handle and said gas spring are connected to substantially the same point on the frame.

6. The improvement claimed in claim 1 or claim 2 wherein the assembly normally is biased in one direction about the first pivot axis, the gas spring connected between the housing and assembly normally to exert a bias in the opposite direction to inhibit the assembly's tendency to rotate about the first pivot axis in the said one direction, and the assembly settable at a predetermined bevel angle to balance the assembly and the gas spring whereby there is no torque about said first pivot axis.

7. The improvement claimed in claim 6 wherein the gas spring is connected between the housing and the assembly to be colinear with a line drawn between the connection of the gas spring and the pivot axis of the assembly with zero torque at said pivot axis.

8. The improvement claimed in claim 7 wherein the gas spring is colinear at a predetermined bevel angle setting of the assembly about said first pivot axis with said angle greater than 0°.

* * * * *